June 22, 1965   R. L. FERRIS   3,190,595
STANCHION
Filed July 22, 1963   15 Sheets-Sheet 1
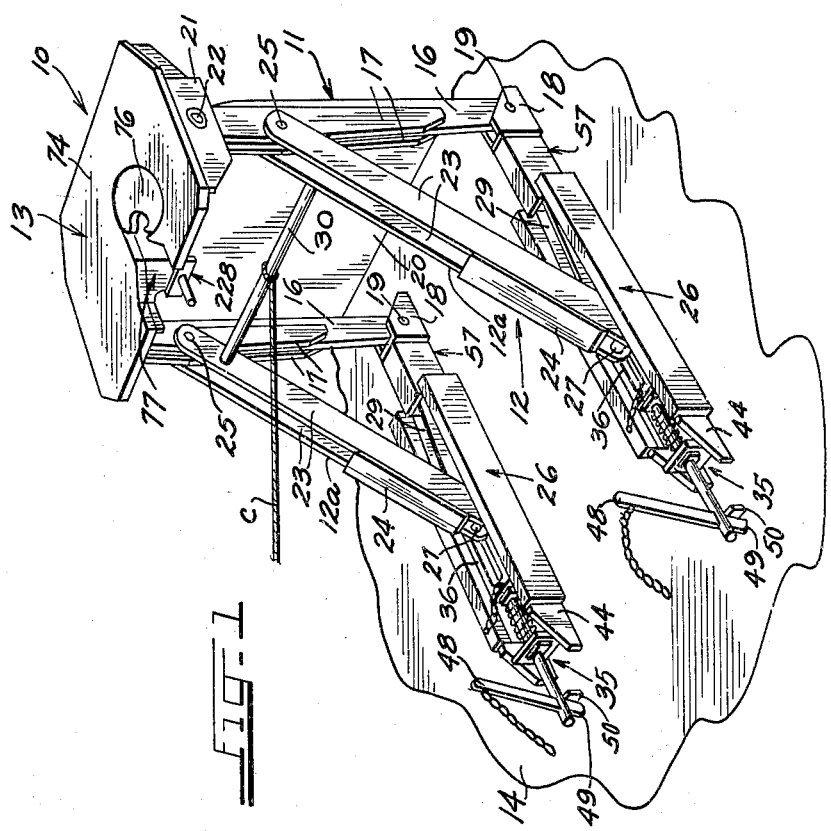
INVENTOR.
RAY L. FERRIS

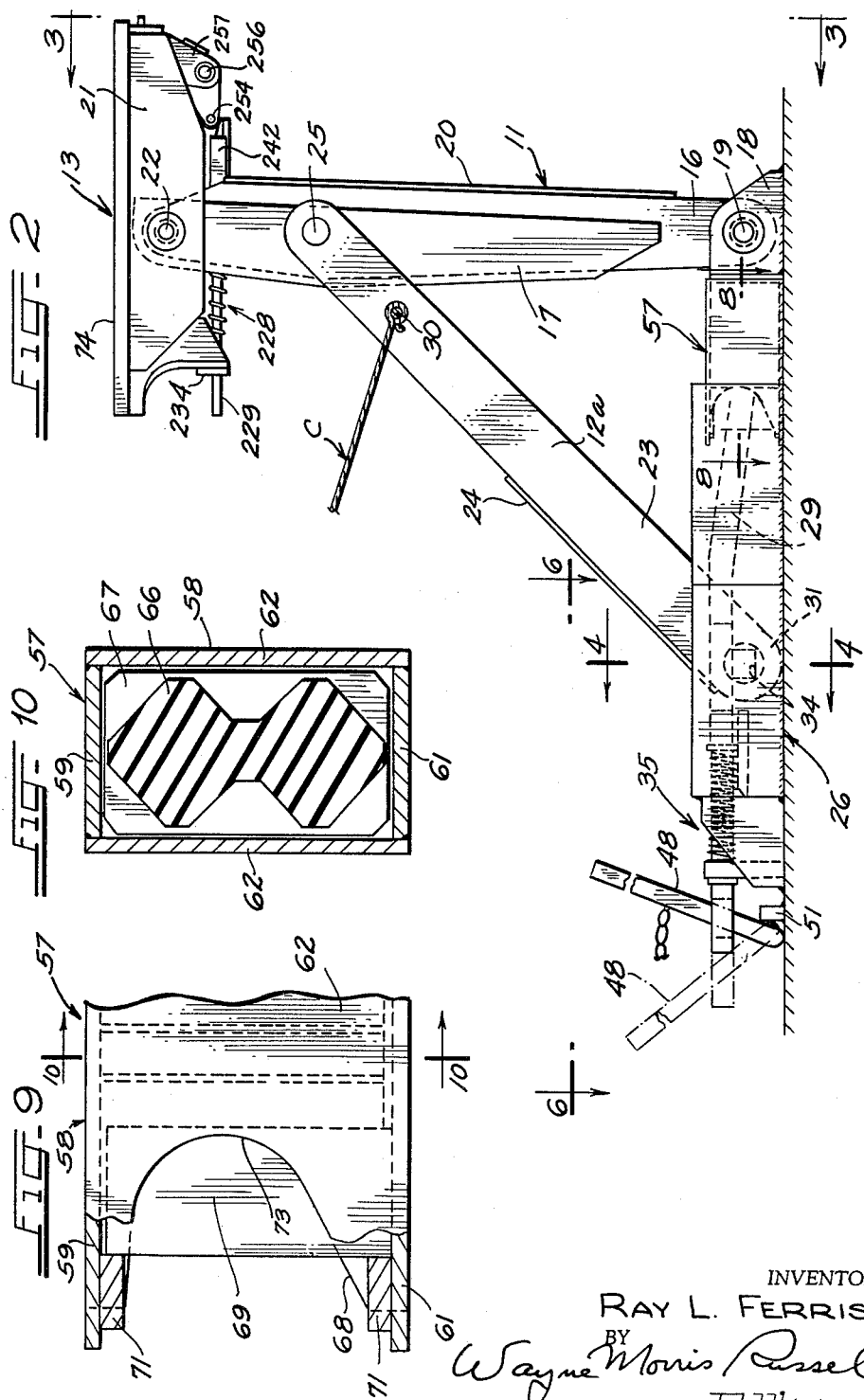

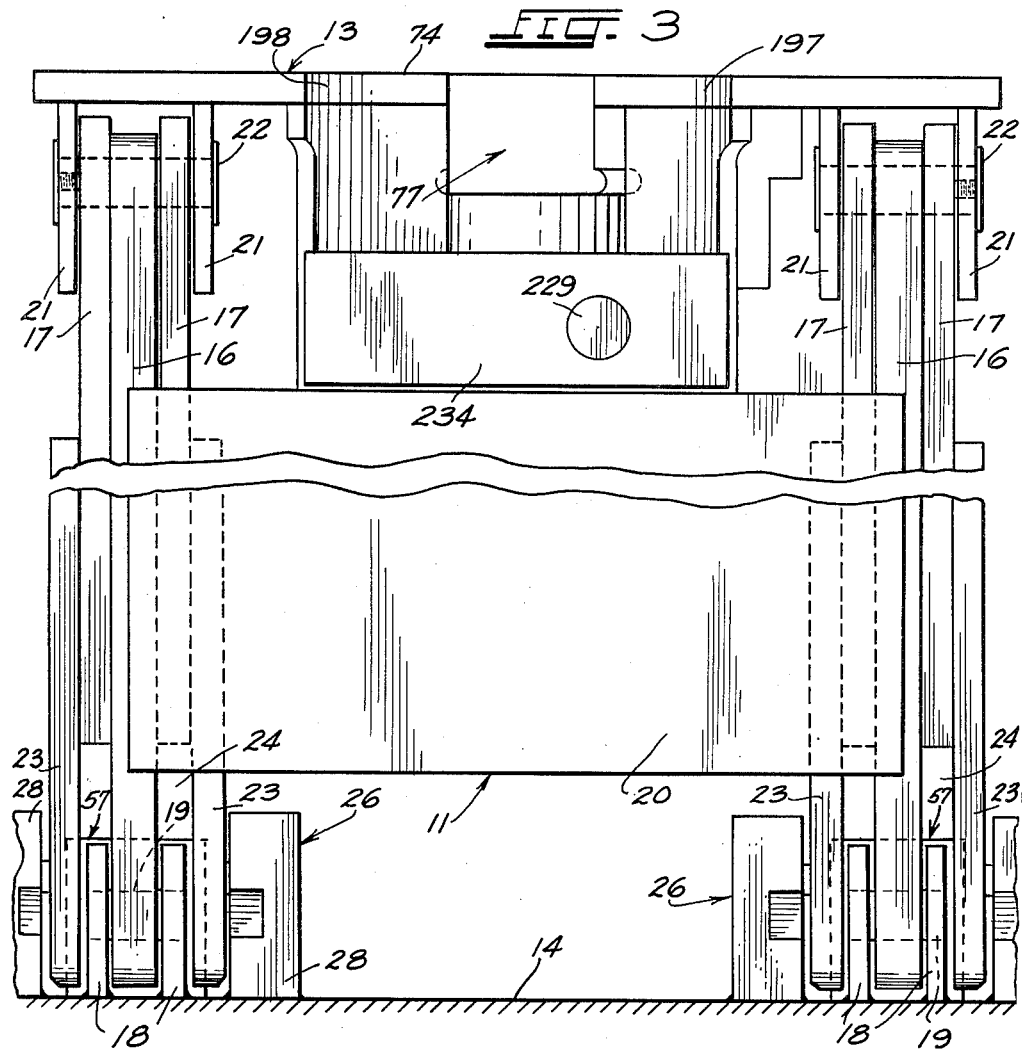
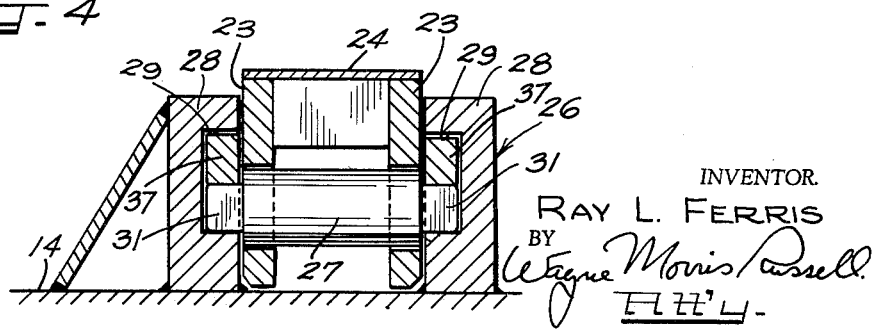
INVENTOR.
RAY L. FERRIS

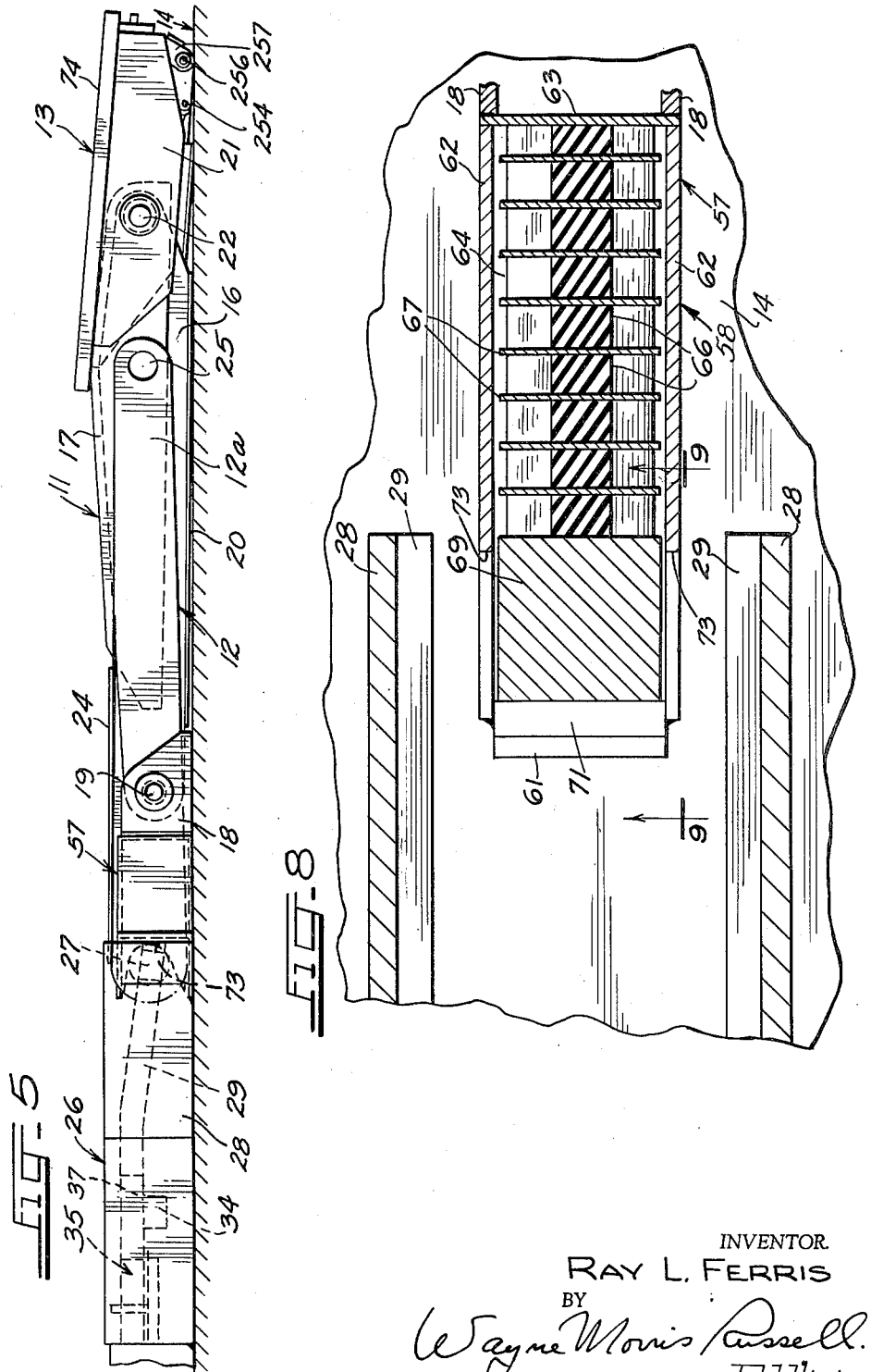

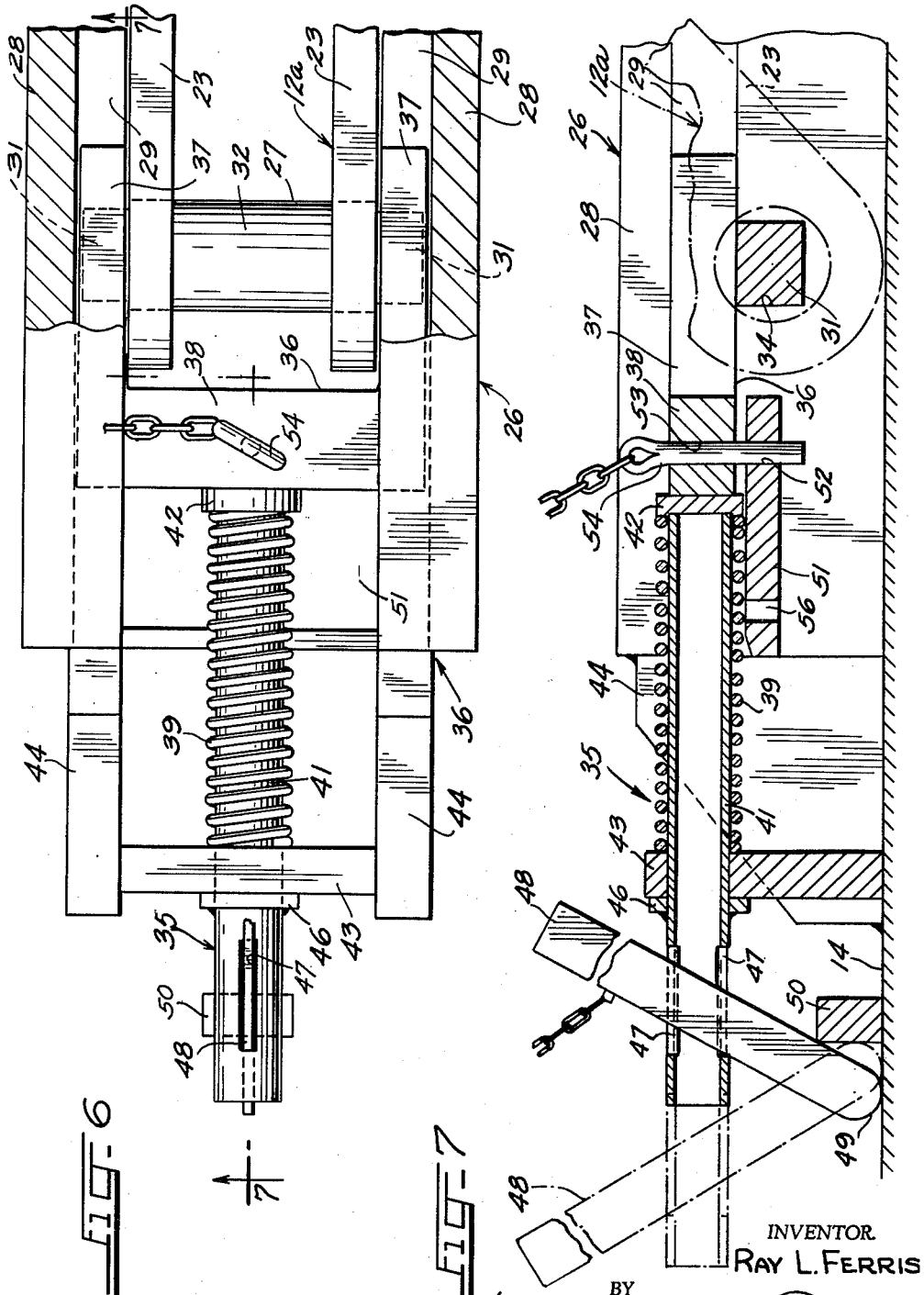

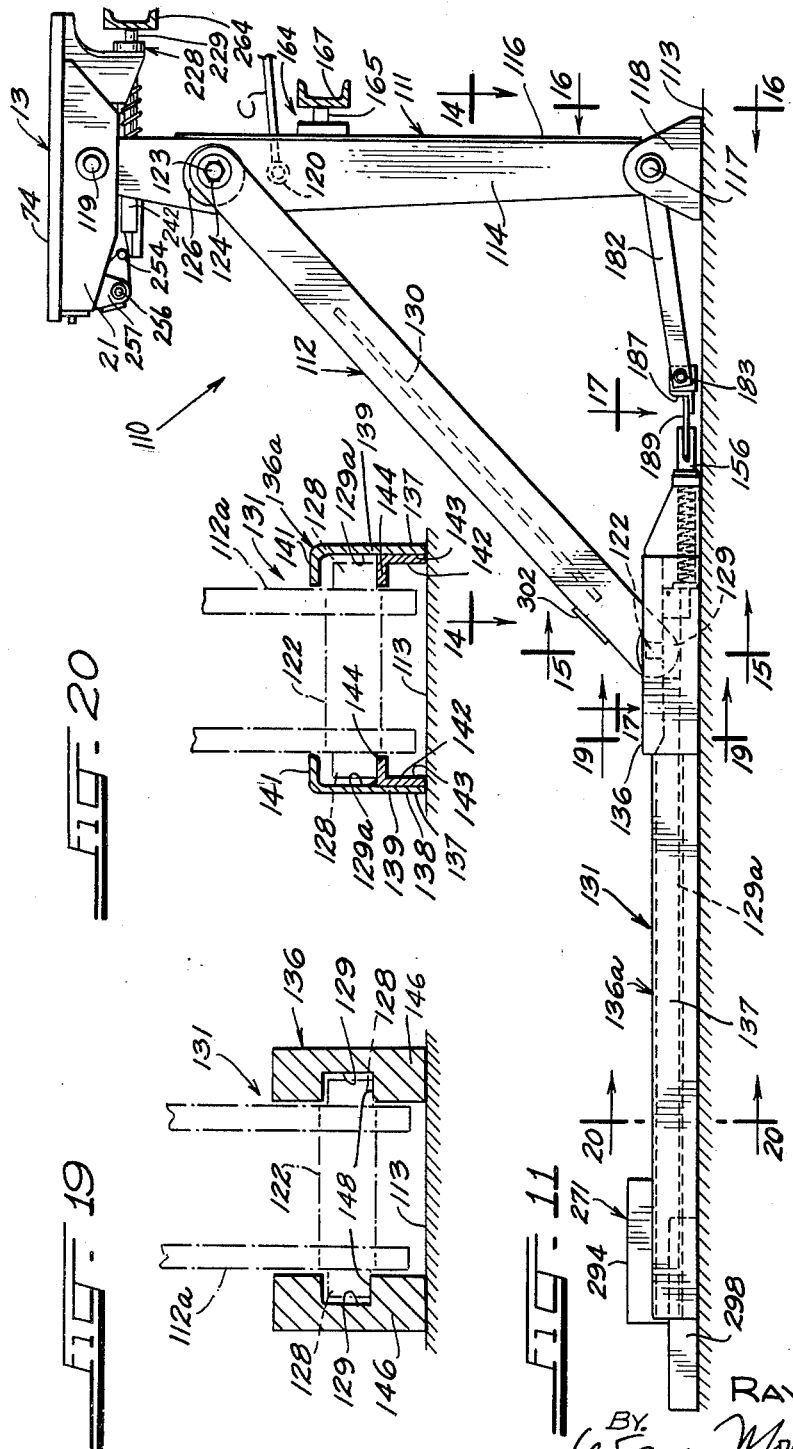

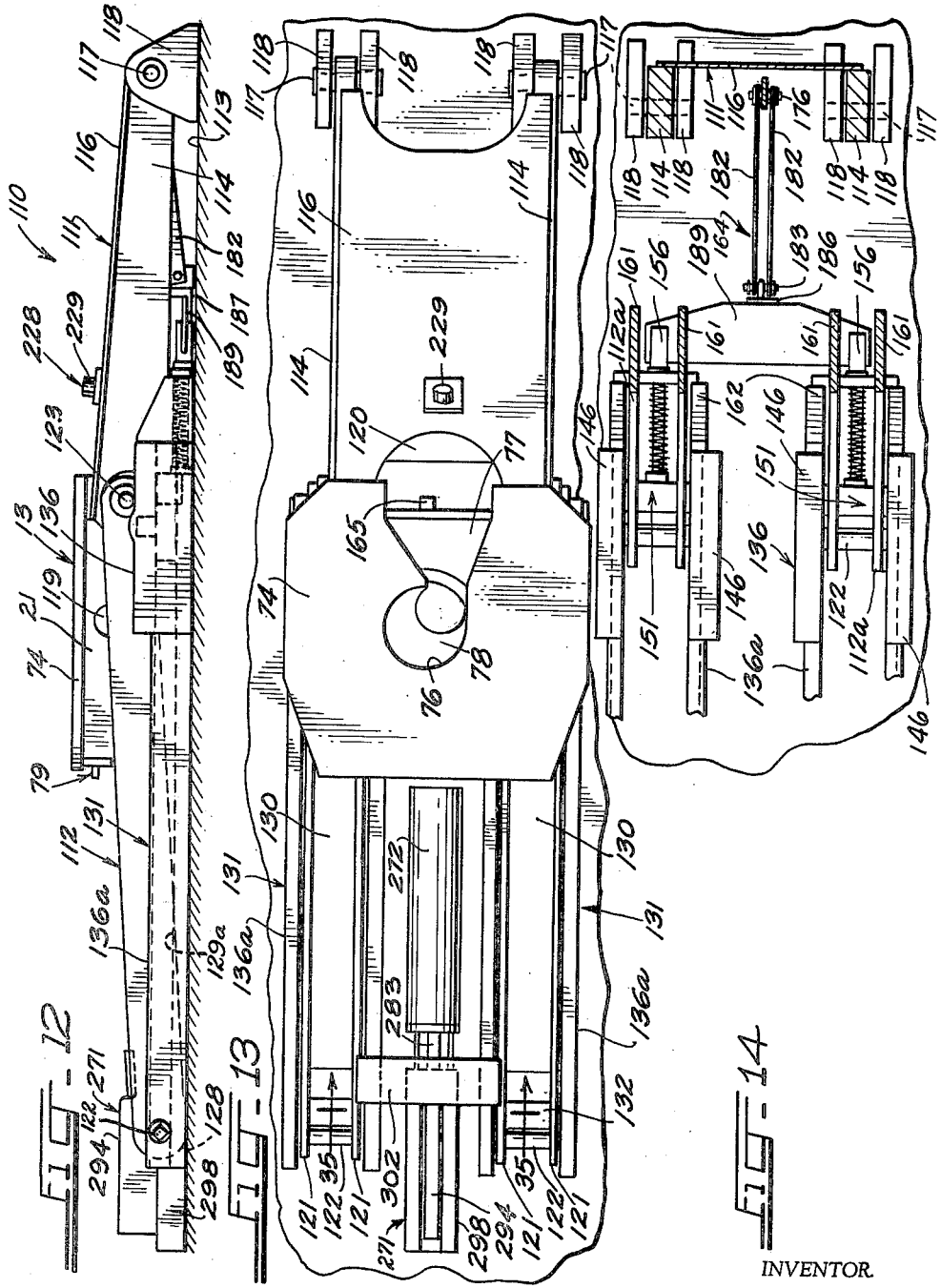

June 22, 1965 R. L. FERRIS 3,190,595
STANCHION
Filed July 22, 1963 15 Sheets-Sheet 8
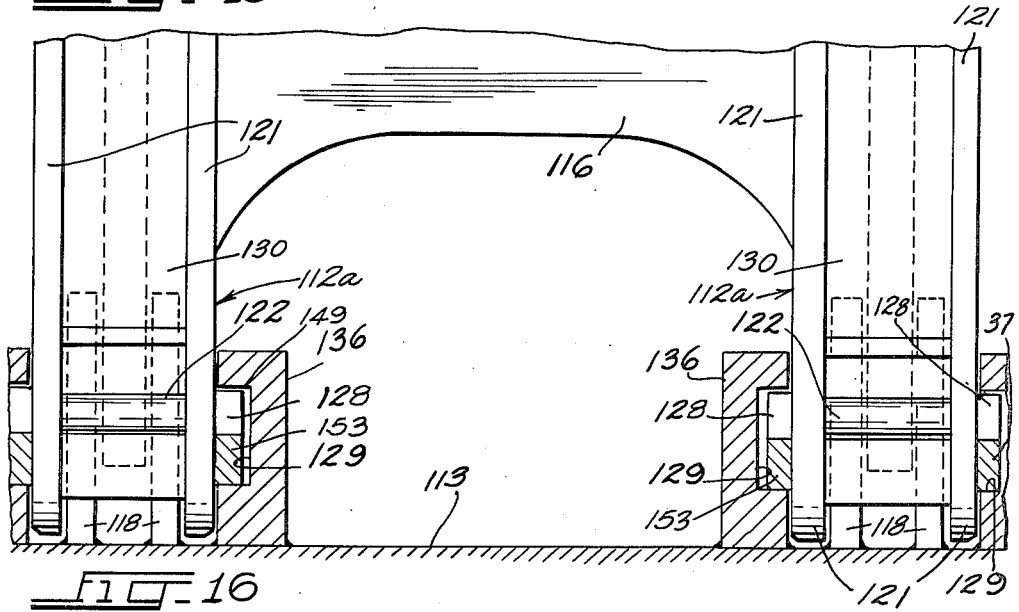
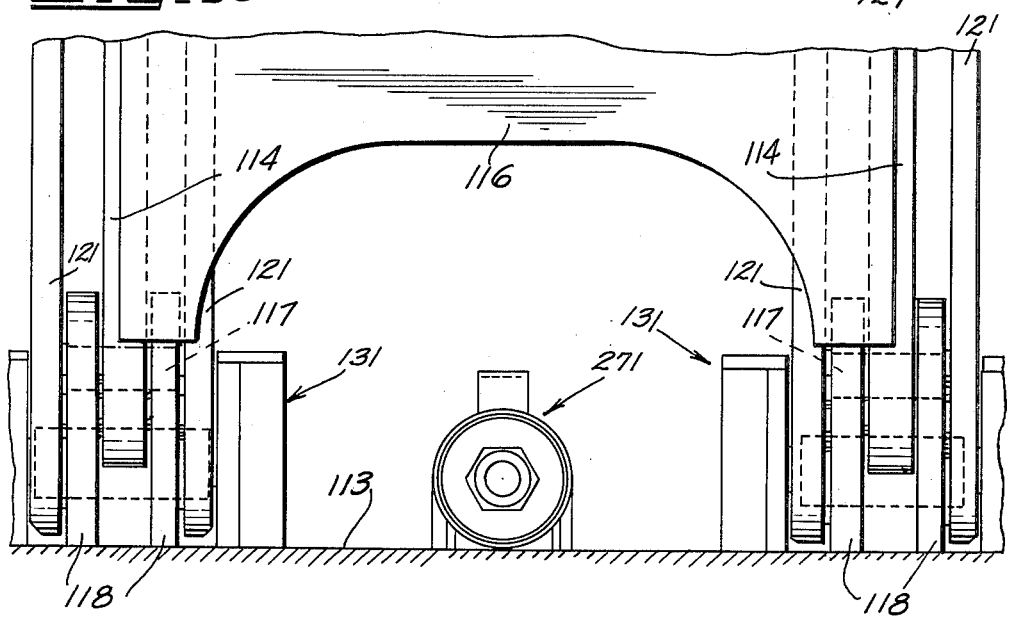
INVENTOR.
RAY L. FERRIS

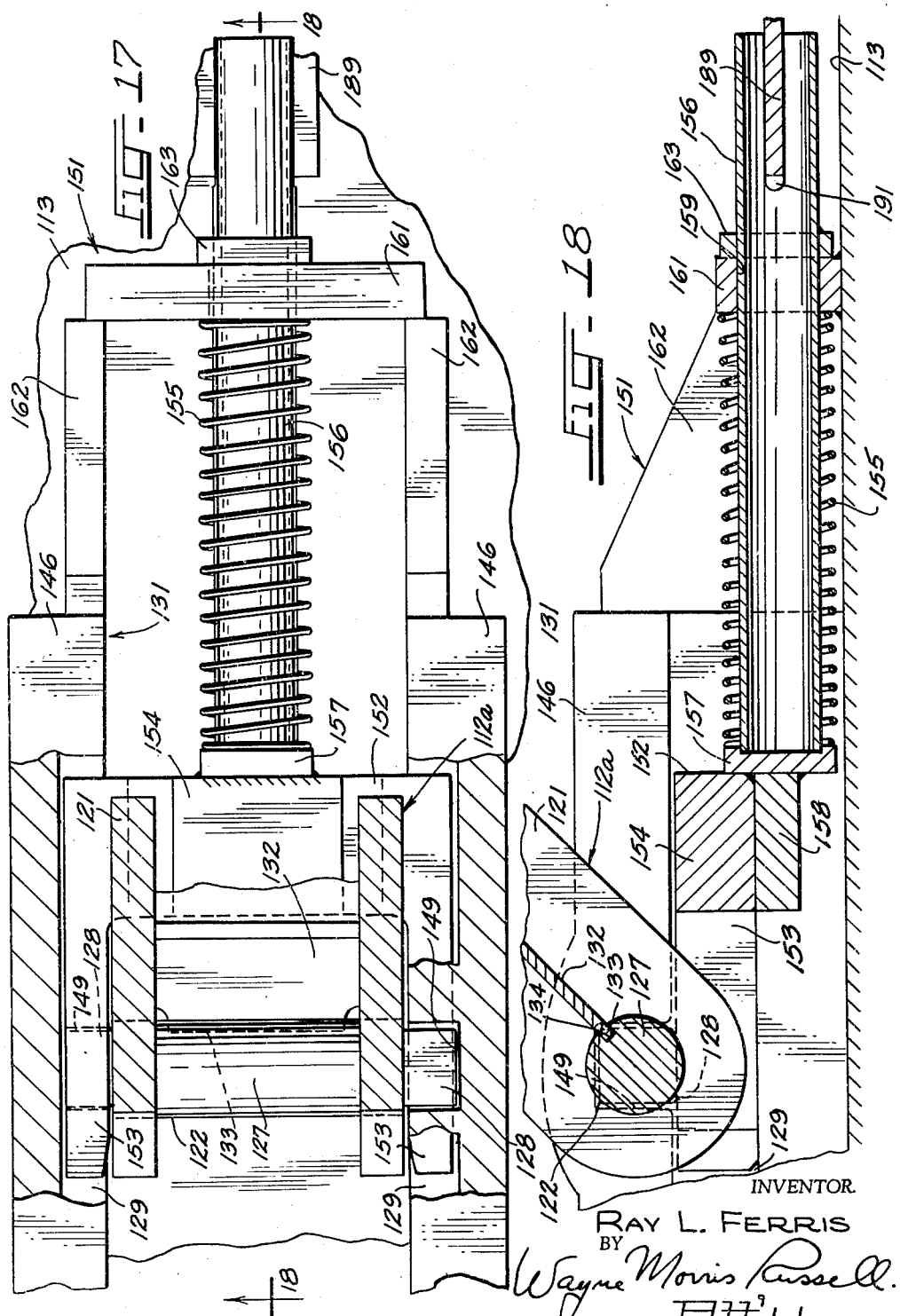

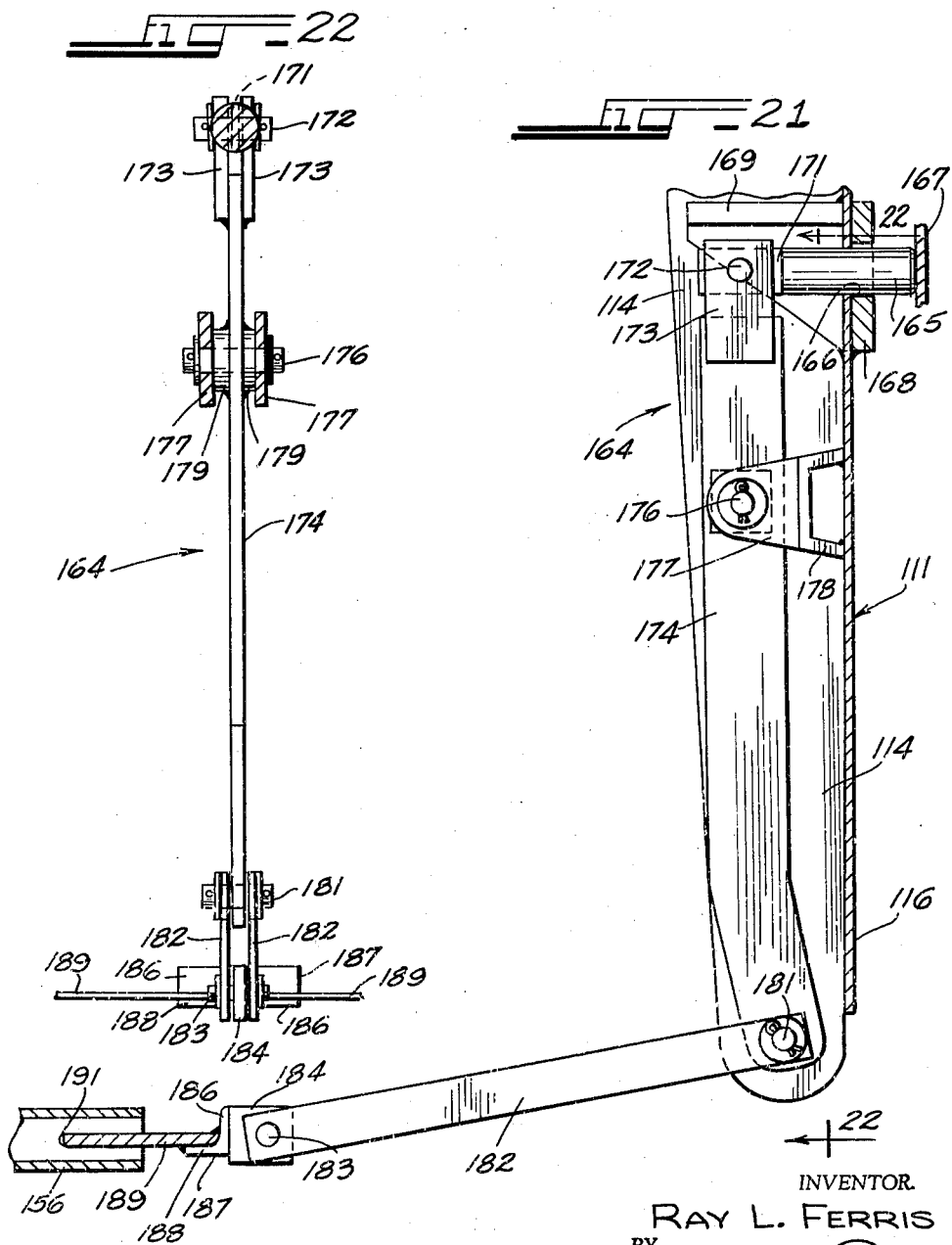

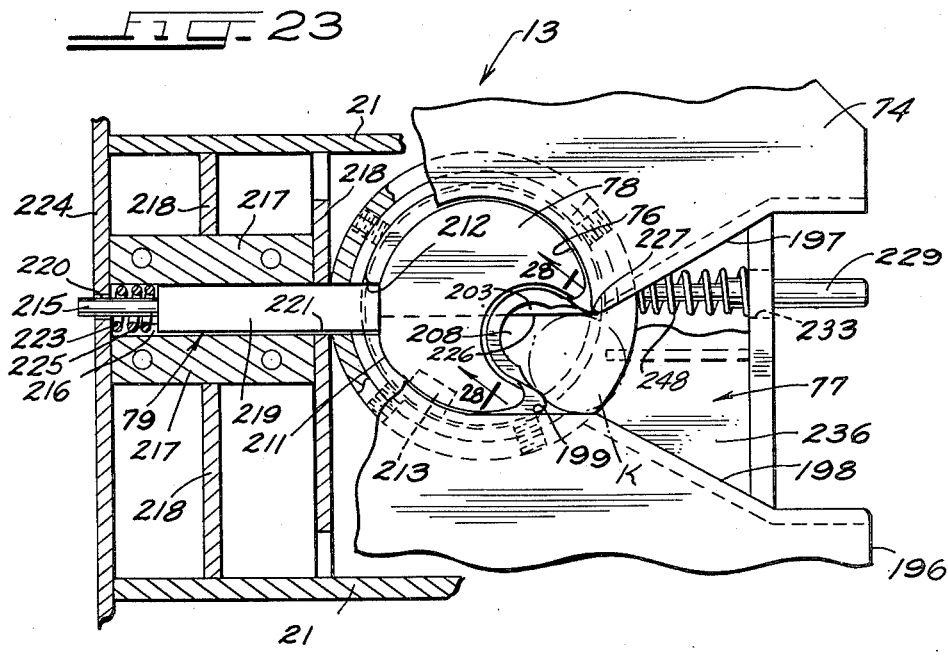
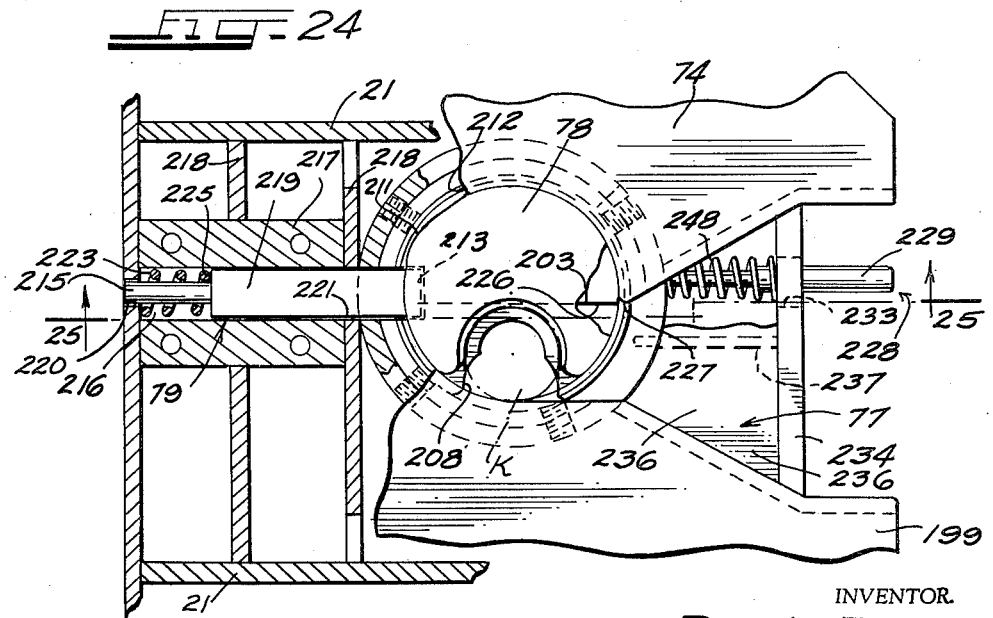

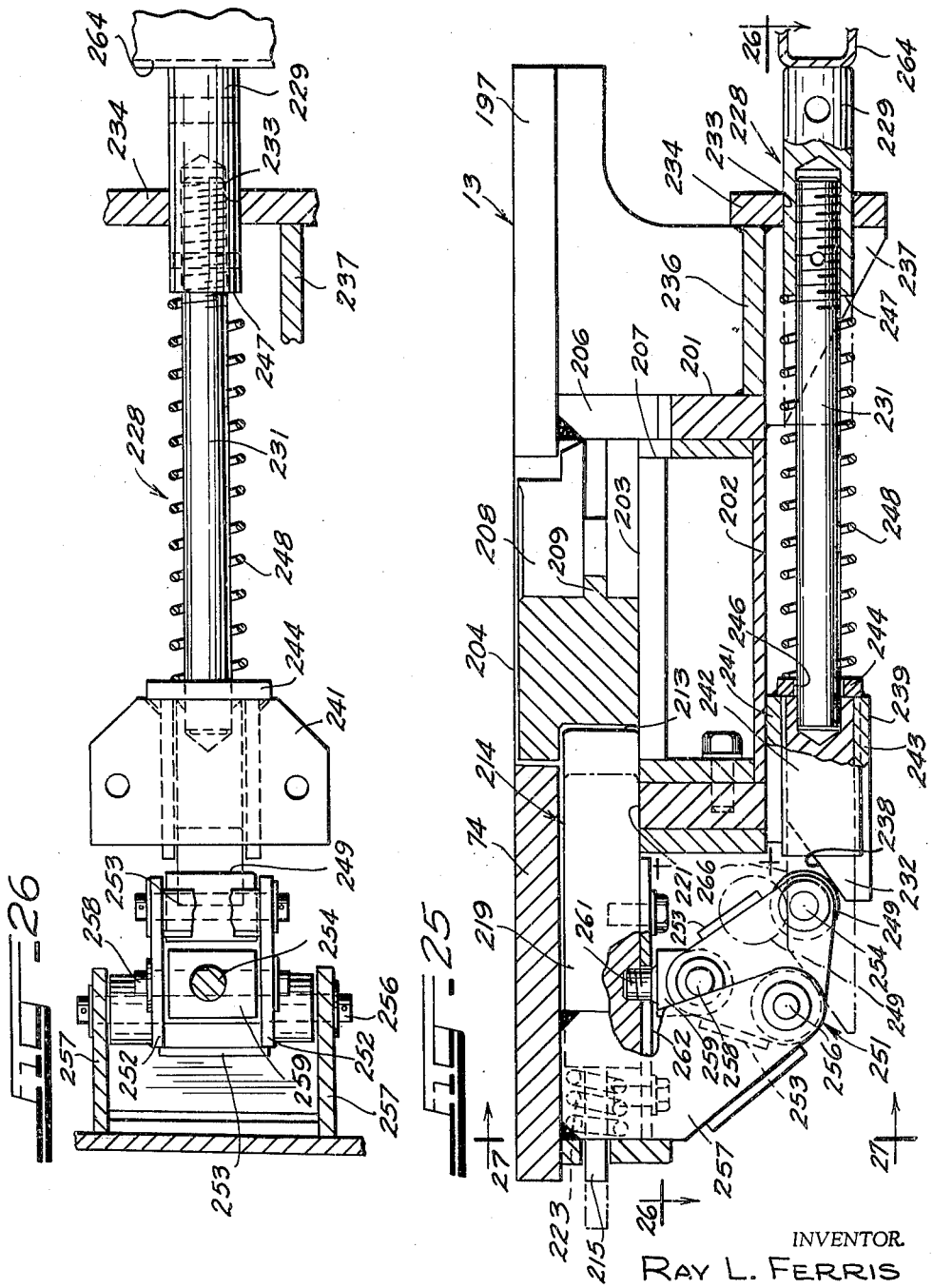

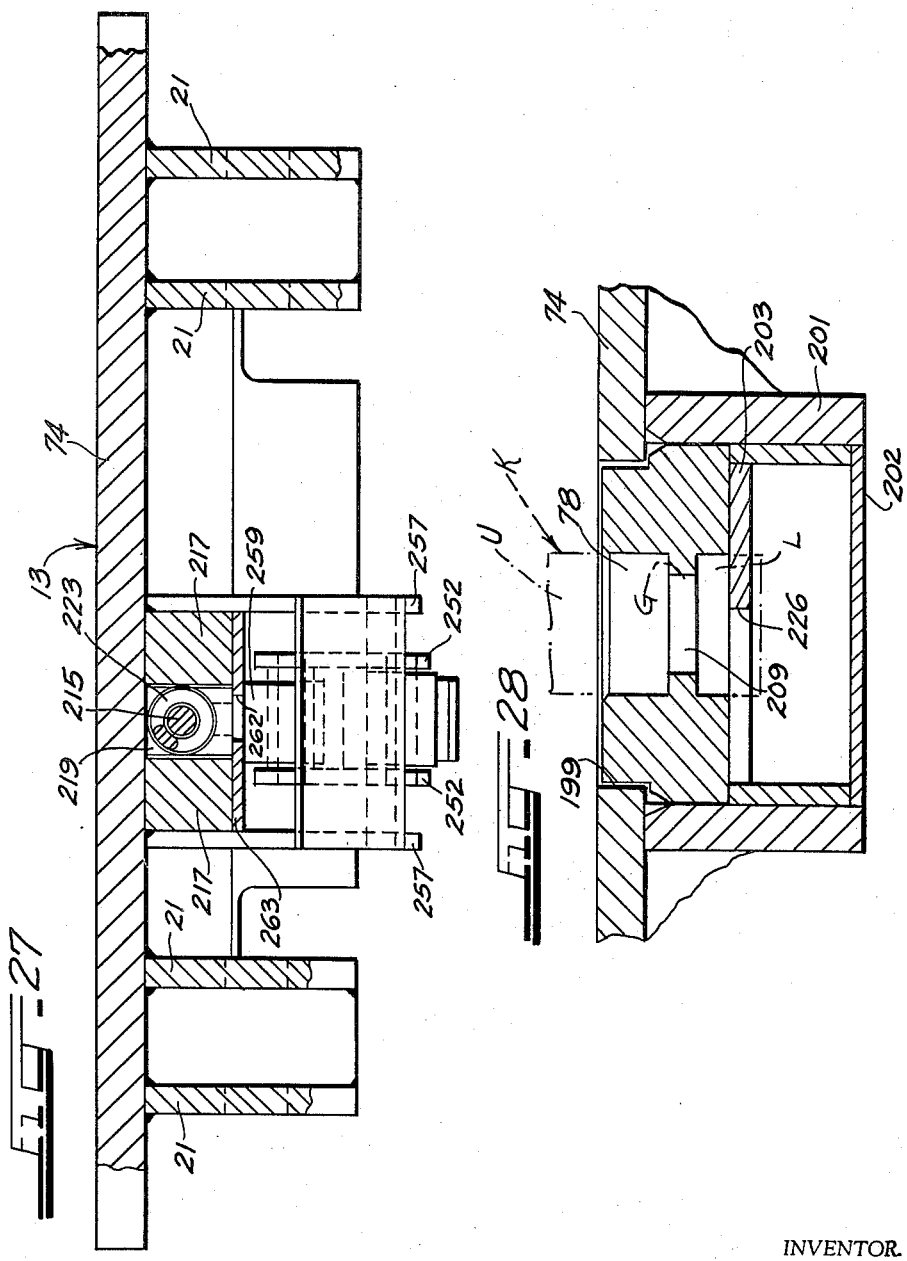

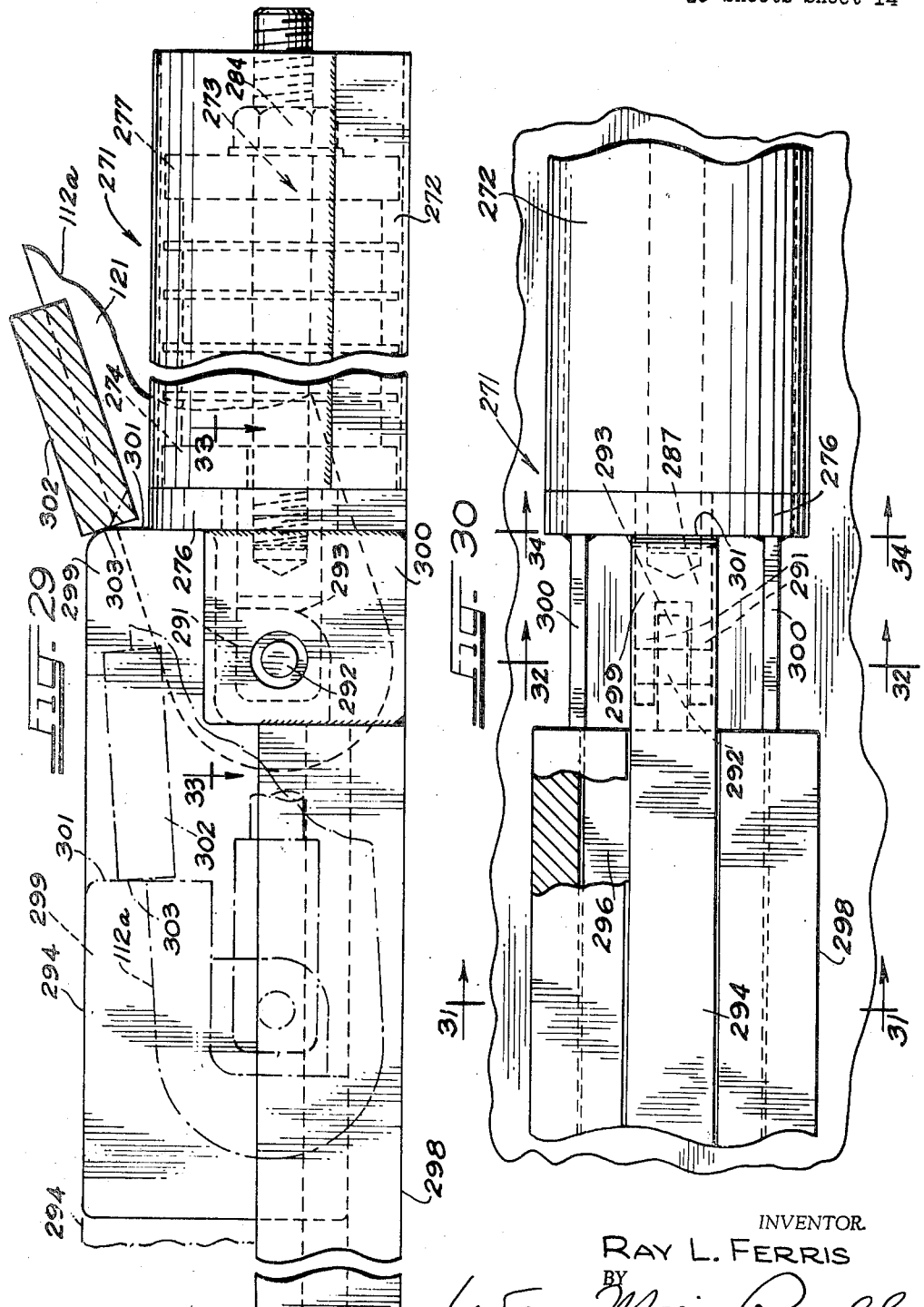

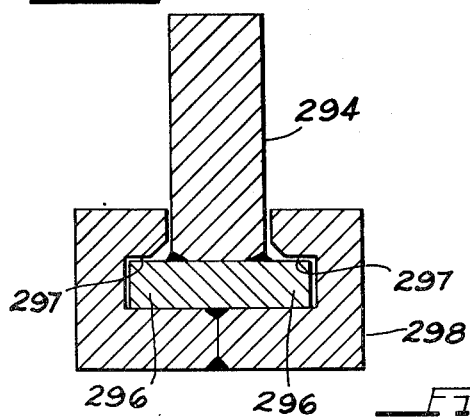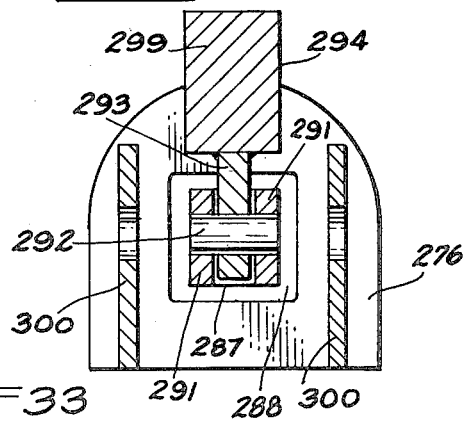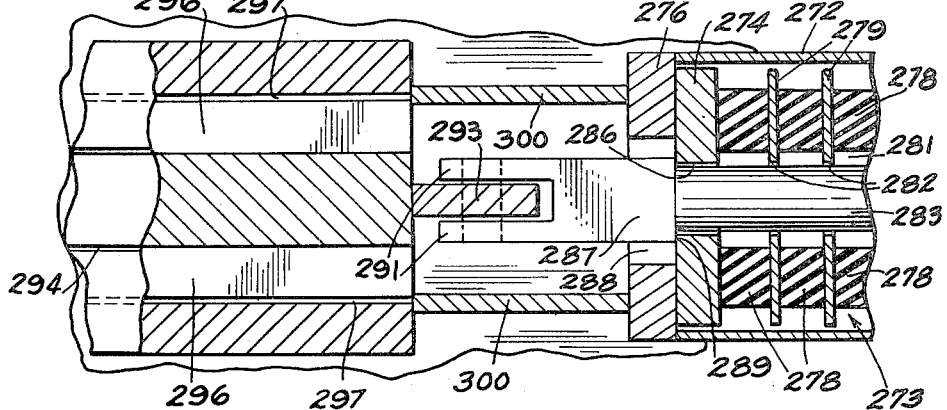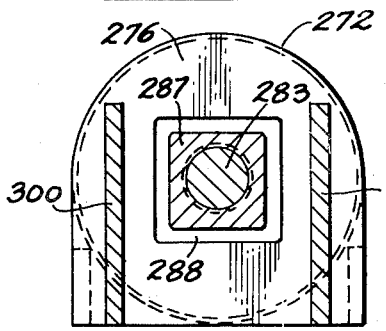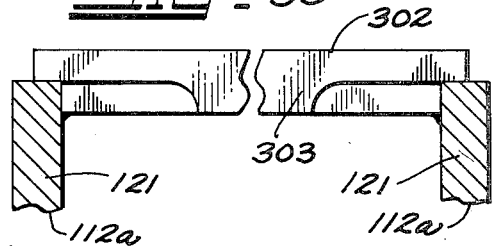
INVENTOR.
RAY L. FERRIS

United States Patent Office 3,190,595
Patented June 22, 1965

3,190,595
STANCHION
Ray Lavern Ferris, Thornton, Ill., assignor to Pullman Incorporated, Chicago, Ill., a corporation of Delaware
Filed July 22, 1963, Ser. No. 296,692
13 Claims. (Cl. 248—119)

The present invention relates to stanchions for mounting and hitching trailers on railway cars and now particularly to a new and improved collapsible stanchion which is constructed so as to be elevated from a collapsed or stored position adjacent the floor to an erect operative trailer supporting and hitching position by a pulling force exerted by a remotely located mechanism and to be freely collapsible under its own weight to the stored position.

It is an object of the present invention to provide a collapsible trailer stanchion of a simple and economical construction.

It is a further object to provide a stanchion of the above described type with a new and improved latching mechanism for maintaining the stanchion in its elevated operative position wherein the latching means is easily released to permit the stanchion to collapse under its own weight to the stored position thereof.

It is still a further object taken in conjunction with the immediately foregoing object to provide a novel arresting arrangement which is disposed to arrest the free falling movement of the stanchion to its stored position and thereby to cushion the impact blow of the stanchion as it assumes the stored position on the car floor.

It is a further object to provide a trailer and hitching plate with an improved kingpin entry guiding arrangement for assuring positive and rapid locking of the kingpin on the plate.

Generally, the collapsible trailer stanchion of the present invention includes a vertical strut pivotally connected at its lower end to a pivot fixed to a base and supports on its upper end a trailer supporting and hitching plate for receiving the kingpin depending from the underside of a trailer. A diagonal strut is connected at one end intermediate the ends of the vertical strut. At its other end the diagonal strut is slidably guided within guides arranged to guide the lower ends of the diagonal strut for lengthwise movement on the base relative to the vertical strut. The diagonal strut guides include a latching arrangement which is operative when the stanchion is disposed in its operative trailer supporting and hitching position to positively lock the diagonal struts against further lengthwise movement until it is desired to release the trailer from the erect position and to position the stanchion in its collapsed position.

To release the fixed pivot there is employed a release actuating means which may be rendered operative by means disposed on the tractors employed to move the trailers. The trailer means is disposed to render the device operative for releasing the pivot latching means when the trailer is located on a trailer unloading position.

Upon release of the pivot latching means the lower end of the diagonal strut is again slidable within the guides means so that the stanchion is rendered free falling. Disposed in the path of movement of the lengthwise movable diagonal strut is a buffer arrangement which is disposed so as to arrest the free falling movement of the stanchion sufficiently and thereby prevent the stanchion from striking the base with a sharp impact.

A feature of the present invention is the provision of an arrangement for automatically releasing the kingpin from locking engagement with the trailer supporting and hitching plate or as commonly referred to, the fifth wheel plate. As is well known fifth wheel plates include an opening in which there is disposed a locking arrangement for retaining the kingpin secured to the stanchion. These locking means are actuated to the kingpin locked position by the action of the kingpin extending through the opening. In accordance with the present invention means are provided for releasing the kingpin locking arrangement automatically when the tractor is located on the railway car for moving the trailer therefrom.

Further objects and features will hereinafter appear.

In the drawings:

FIG. 1 is a perspective view of a stanchion embodying the present invention;

FIG. 2 is a side elevational view of the stanchion of FIG. 1;

FIG. 3 is a fragmentary end view taken generally along the lines 3—3 of FIG. 2;

FIG. 4 is a cross-sectional view through the diagonal strut guiding means taken substantially along the lines 4—4 of FIG. 2;

FIG. 5 is a side elevational view showing the stanchion in its collapsed position;

FIG. 6 is a fragmentary top plan view taken generally along the lines 6—6 of FIG. 2 and showing in particular the arrangement employed for holding the diagonal strut slide pins fixed against lengthwise sliding movement within the guiding means;

FIG. 7 is a cross-sectional view taken generally along the lines 7—7 of FIG. 6;

FIG. 8 is a cross-sectional view taken generally along the lines 8—8 of FIG. 2 showing in particular the buffer arrangement employed to arrest the free falling movement of the stanchion to the collapsed or stored position thereof;

FIG. 9 is a fragmentary side elevational view of one end of the buffer arrangement taken generally along the lines 9—9 of FIG. 8;

FIG. 10 is a cross-sectional view taken generally along the lines 10—10 of FIG. 9;

FIG. 11 is a side elevational view of another embodiment of a stanchion embodying the present invention with the stanchion shown in the erect operative trailer supporting position;

FIG. 12 is a side elevational view of the stanchion of FIG. 11, but showing the stanchion in its collapsed or stored position;

FIG. 13 is a top plan view of the stanchion in its stored position;

FIG. 14 is a cross-sectional view taken generally along the lines 14—14 of FIG. 11;

FIG. 15 is a view taken generally along the lines 15—15 of FIG. 11 showing in particular the locked position of the diagonal strut within the guiding means;

FIG. 16 is a view taken generally along the lines 16—16 of FIG. 11 showing in particular the attachment of the upright strut to the base;

FIG. 17 is an enlarged view taken generally along the lines 17—17 of FIG. 11 showing the latching arrangement for locking the slidable diagonal strut fixed against lengthwise movement;

FIG. 18 is a cross-sectional view taken generally along the lines 18—18 of FIG. 17;

FIG. 19 is a view taken generally along the line 19—19 of FIG. 11 of one of the guide blocks of the diagonal strut guides and showing the slide pin on one of the diagonal strut legs as the pin is disposed therein during sliding movement;

FIG. 20 is a view taken generally along the lines 20—20 of FIG. 11 of one of the guideways of the diagonal strut guide means and showing in phantom the slide pin on one of the diagonal strut members disposed within the guideways during sliding movement;

FIG. 21 is an enlarged fragmentary side elevational view showing the mechanism for releasing the diagonal strut latch mechanism;

FIG. 22 is a sectional view taken generally along the lines 22—22 of FIG. 21;

FIG. 23 is an enlarged fragmentary top plan view of the fifth wheel plate assembly with some of the parts being broken away to show underlying details of structure and with the kingpin locking components being shown in the open position thereof;

FIG. 24 is an enlarged fragmentary top plan view similar to FIG. 23, but showing the components in the kingpin locking position thereof;

FIG. 25 is a cross-sectional view taken along the lines 25—25 of FIG. 24 showing in particular the mechanism for releasing the locking jaw;

FIG. 26 is a top view of the kingpin releasing mechanism taken generally along the lines 26—26 of FIG. 25;

FIG. 27 is a cross-sectional view taken generally along the lines 27—27 of FIG. 25;

FIG. 28 is a cross-sectional view taken generally along the lines 28—28 of FIG. 23 showing the relationship of the kingpin locking components in the open position and the kingpin, shown in phantom lines as the latter initially engages the locking jaw;

FIG. 29 is a fragmentary side elevational view of the buffer unit and the lower end of the diagonal strut co-acting therewith as the stanchion is falling to its collapsed position;

FIG. 30 is a fragmentary top elevational view of the buffer unit shown in FIG. 29;

FIG. 31 is a cross-sectional view taken generally along the lines 31—31 of FIG. 30;

FIG. 32 is a cross-sectional view taken generally along the lines 32—32 of FIG. 30;

FIG. 33 is a cross-sectional view taken generally along the lines 33—33 of FIG. 29;

FIG. 34 is a cross-sectional view taken generally along the lines 34—34 of FIG. 30; and FIG. 35 is a cross-sectional view taken generally along the lines 35—35 of FIG. 13.

Referring now to FIGS. 1–10 of the drawings and in particular FIGS. 1, 2, 3, and 5, the trailer stanchion 10 embodying the present invention includes generally a vertical strut 11, a diagonal strut 12, and a trailer support and hitching fifth wheel plate assembly 13 mounted on the upper end of the vertical strut 11. The vertical and diagonal struts 11 and 12 are mounted on a base 14 which may form part of the stanchion 10 or which may be the floor structure of the railway car on which the stanchion 10 is mounted. Preferably, the stanchion 10 is mounted on the cushioned structure of the railway car which is movable relative to the car body so as to relieve the stresses imposed on the stanchion. The diagonal strut and vertical strut 11 and 12 are mounted on the base 14 for movement from a collapsed position to an erect operative position upon the application of a pulling force exerted on the diagonal strut.

As shown, the vertical strut 11 comprises a pair of transversely spaced legs 16 formed from suitable sheet material and each leg 16 may include side plates 17 fixed along the opposite sides adjacent the upper end of the legs 16. Extending between and fixed to the legs 16 is a reinforcing plate 20. The legs 16 are each pivotally connected at their lower ends to pivot brackets 18 by means of a pin 19. The upper ends of the legs 16 and the reinforcing plates 17 are disposed between respective pairs of spaced flanges 21 depending from the underside of the plate 74 of the fifth wheel plate assembly 13 and pivotally connected thereto by means of pivot studs 22.

The diagonal strut 12 includes transversely spaced strut members 12a of identical structure, each including a pair of vertically disposed and transversely spaced plates 23 of which the upper ends embrace the respective opposite outer surfaces of the vertical strut leg side plates 17. A pivot pin 25 connects the upper ends of the plates 23 to the vertical strut 11 at a point disposed below the fifth wheel plate pivot pin 22. Extending across the upper edges of each of the pairs of plates 23 adjacent the lower end thereof is a reinforcing plate 24. Fixed between and spanning the inner plates 23 of the diagonal struts 12a is a pull-up rod 30 to which a cable c or the like is adopted to be attached for pulling the stanchion from its collapsed position shown in FIG. 5 into its erected position shown in FIGS. 1 and 3.

As illustrated the embodiment of the invention of FIGS. 1–10 the stanchion 10 is constructed so as to fold or collapse clockwise as viewed, for example, in FIG. 1. To achieve clockwise collapsing of the stanchion 10 the lower ends of the diagonal strut 12a are arranged upon erection of the stanchion to slide lengthewise of the base 14 away from the fixed pivot 18 of the vertical strut 11 and toward the fixed pivot brackets 18 upon collapse thereof.

The lengthwise sliding is accomplished as shown in particular in FIGS. 4–6 by the provision of strut guiding means 26 which serve to guide slide pins 27 fixed to lower ends of each of the diagonal strut members 12a. The strut guiding means 26 each includes a pair of transversely spaced rectangular blocks 28 fixed to the base 14. Formed on inner walls of each of the blocks 28 is a slot 29 which receives the respective ends 31 of the diagonal strut slide pin 27. The guide pin slots 29 are arranged so as to guide the slide pins 27 for lengthwise movement substantially parallel to the base 14. However, in order to maintain the height of the stanchion 10 in the collapsed position at a minimum, as shown in FIG. 5, the slots 29 may be inclined downwardly for a portion of the length adjacent to the fixed vertical strut pivot brackets 18.

As shown, the ends 31 of the slide pins 27 fixed to the respective lower ends of the diagonal strut members 12a are formed at their projecting ends of rectangular sections and with an intermediate length of substantially cylindrical section. In the fully erected position of the stanchion 10 the slide pins 27 align with downwardly depending locking notches 34 formed in the blocks 28 and communicating with the grooves or slots 29. In the erected position the vertical components of the pulling force transmitted through the diagonal struts 12 are such as to force the ends 31 of the diagonal strut slide pins 27 downwardly into the notches 34 into seating engagement therein and thereby prevent further lengthwise movement of the diagonal strut 12.

In accordance with the present invention there is associated with each of the guiding means 26 a latching arrangement 35 for retaining the rectangular end sections 31 of the diagonal strut slide pins 27 captured within stop notches 34 and thereby preventing inadvertent collapse of the stanchion 10. As shown in FIGS. 6 and 7 the latching arrangement 35 includes a yoke 36 having arms 37 extending inwardly from a bight portion 38. The arms 37 are slidably disposed within the guiding grooves 29. Biasing the yoke 36 so that the arms 37 normally overlie the locking notches 34 is a biasing spring 39. The biasing spring 39 is supported on a tubular rod 41 to one end of which there is fixed a stop disc 42 which is fixed to the bight 38 of the yoke 36. Adjacent other end the tubular rod 41 is slidably supported by a cross piece 43 of which the ends are fastened to transversely spaced brackets 44 which are fixed to the base 14 along the bottom edges and to the guide blocks 28 along the inner upright edges thereof. Secured to the tubular rod 41 is a stop collar 46 which is arranged to abut the outer wall of the cross piece 43. The biasing spring 39 disposed between the cross piece 43 and the yoke 36 normally urges the stop collar 46 into abutting engagement with the outer wall of the cross piece 43 and thereby limits the inward movement of the yoke 36 to the notch overlying position shown in FIGS. 6 and 7.

Outwardly of the stop collar 46 the rod 41 is formed with an elongated slot 47 through which there extends a lever 48. The lever 48 is freely accommodated for rocking movement within the slot and is formed at the lower end thereof with an arcuate nose 49 so as to be rockable on the base 14. Normally, as above described, the spring 39 urges the rod 41 and the yoke fixed thereto inwardly such that the lever 48 assumes the position, shown in full lines in FIG. 7, abutting along the inner edge thereof a fulcrum block 50 fixed to the base 14. Along the outer edge, the lever contacts the outer lower end of the slot 47 so that the lever is inclined to the right. The force of the spring 39 urging the rod 41 inwardly serves to retain the lever in the full line position shown. In this position the arms 37 of the yoke 36 fixed to the end of the tubular rod 41 and guided within the guide slots 29 overlie and extend beyond the locking notches 34.

Assuming that the stanchion is in the collapsed position, upon raising the stanchion the diagonal strut slide pins 27 move outwardly within the slots 29 toward the locking notch 34. When the rectangular ends of the diagonal strut slide pins 27 guided within the guide slots 29 engage the ends of the yoke arms 37, the yoke 36 is moved outwardly against the force of the biasing spring 39 and at the same time the tubular rod 41 fixed to the bight 38 also moves outwardly. In this connection it is to be noted that the lever 48, which extends through the elongated slot 47, is rocked about its arcuate nose 49 to the position shown in phantom lines in FIG. 7 so that it does not restrict the movement of the yoke 36.

When the rectangular ends 31 are aligned with the locking notches 34, as above described, the vertical component of the pulling force transmitted to the diagonal strut members 12a is operative to seat the rectangular ends within the notches 34 which are of sufficient depth such that the upper surface of the rectangular ends 31 clear the lower guide surface of the slots 29. Thereafter the force of the biasing spring 39 is operative to move the yoke 36 inwardly to the latched position wherein the arms 37 overlie the locking notches 34 and the rectangular ends 31 disposed therein. In this manner the diagonal strut slide pins 27 are restrained against further lengthwise movement and prevented from re-entering the guide slots 29 and thereby prevents inadvertent collapse of the stanchion 10.

To further assure that the yoke remains fixed in a locked position overlying the diagonal strut slide pins 27 there is fixed between the guide blocks 28 a lock plate 51 having an opening 52 which aligns with an opening 53 formed in the bight 38 when the yoke 36 is in the latched position. A locking pin 54 suitably attached to the stanchion 10 by a chain or the like is then inserted through the aligned openings 53 and 52.

To release the latching means 34, the locking pin 54 is removed and the lever 48 is rocked to the left as shown in the phantom line position of FIG. 7. This causes the tubular rod 41 and the yoke 36 fixed thereto to be moved outwardly against the force of the biasing spring 39 so that the arms 37 no longer overlie the locking notches 34. The yoke 36 is held in the unlocked position by way of the locking pin 54 which is received within the opening 53 and an aligned opening 56 also formed in the locking plate 51. Thereafter, the stanchion is nudged as by the tractor employed for removing the trailer from the car, to the left, as viewed in FIG. 2, so that the upward component of the force transmitted through the diagonal struts 12 unseats the rectangular ends 31 from the locking notches 34 and into the guiding grooves 29. In this manner the stanchion is rendered free falling in a clockwise direction, as view shown in FIGS. 1 and 3.

During free falling of the stanchion the diagonal strut slide pins 27 move to the right and prior to the time that the upright strut 11 and fifth wheel plate strike the base 14, the slide pins 27 engage buffer units 57 associated with the respective ones of the guide means 26 to arrest the free falling movement of the stanchion and thereby to prevent sharp impact thereof with the base. As shown, in particular in FIGS. 8–10, the buffer units 57 each comprise a rectangular housing 58 having a top wall 59, bottom wall 61 and side walls 62 and an end wall 63. Disposed within the housing 58 is a shock absorbing means 64 including a plurality of rubber pads 66 between adjacent pairs of which there is adhered metallic separating discs 67. Disposed adjacent to the open end 68 of the housing 58 is a follower block 69 of which the forward face is engageable with stops 71 fixed to the top and bottom walls 59 and 61. Conveniently, the end walls 63 of the housings are fixed to the respective pairs of pivot brackets 18 of the vertical strut 11.

As shown in FIGS. 8 and 9, the forward ends of each of the buffer units 57 extend between guide block members 28 of the respective guide assemblies 26. Moreover, the housing side walls 62 are spaced from the inner walls of guide blocks 28 to accommodate the width of the legs 23 of the diagonal struts 12 therebetween in the collapsed position and so that the cut-out ends 73 formed in the side walls 62 are located in the path of movement of the slide pins 27. Thus, as the stanchion 10 is moving toward its collapsed position, the slide pins 27 enter the cut-outs 73 and engage the follower blocks 69 whereby the cushioning pads 66 are compressed and provide a force resisting inward movement of the diagonal strut and thereby arrest the free falling movement of the stanchion 10. However, the cushioning means is constructed such that the resisting force of the shock absorbing unit 64 is not sufficient to prevent the full collapse of the stanchion 10 to the position shown in FIG. 5. In the collapsed position of the stanchion, the slide pins 27 lie within the cut-outs 73 and maintain the cushioning unit 64 compressed against the housing end wall 63.

To raise the stanchion 10 a cable C or the like is attached to the diagonal strut rod 30. The cable may be attached to a winch or take-up mounted on the tractor (not shown) and the cable is taken up to apply an upward pulling force on the stanchion. Upon the application of the pulling force the vertical strut 11 turns about its pivoted connection at the brackets 18 and the diagonal strut members 12a connected thereto are accordingly also raised so that the slide pins 27 fixed to the lower ends thereof slide outwardly in the respective guide blocks 26. During the initial lifting of the stanchion, the force exerted by the compressed cushioning unit 64 which engages the slide pins 27 is also operative to assist in raising of the stanchion. As above described, when the rectangular ends 31 of the slide pins 27 engage the yoke arms 37, the latter are pushed outwardly against the force of the biasing spring 39 until the rectangular ends 31 align with and are seated within the locking notches 34 whereupon the spring 39 urges the yoke 36 inwardly and the arms 37 overlie the slide pin rectangular ends 31 to retain strut 12 locked against lengthwise movement. In this manner, the stanchion remains latched in its erect operative position as shown in FIGS. 1 and 3.

In the erect operative positive the fifth wheel support plate assembly 13 is positioned so as to support and hitch the trailer on the railway car. The fifth wheel support plate assembly 13 includes generally a plate 74 having the pairs of downwardly depending flanges 21 which support the pivot pins 22 for attaching the plate assembly 13 to the upper ends of the vertical strut legs 11. The plate 74 is formed with a substantially centrally located circular opening 76 communicating with an entry slot 77 extending inwardly from the leading edge of the plate. Suitably supported on the underside of the plate and disposed in the opening is a turnable coupler saw 78. The locking jaw 78 is constructed and arranged such that as the kingpin depending from the underside of the trailer enters through the entry slot, the jaw is rotated in a manner closing off the entry slot 77 and grasping the kingpin K to prevent lifting thereof from the plate. Associated with the coupler jaw 78 is a locking mechanism 79 for holding the jaw in its locked position hitching the trailer to the car. A more detailed description of the fifth wheel support plate assembly will hereinafter appear.

Referring now in particular to FIGS. 11–20 there is illustrated a second embodiment of a stanchion 110 embodying the present invention. The stanchion 110 includes generally a vertical strut 111, a diagonal strut 112, and a fifth wheel plate support assembly 13, which latter may be identical to the fifth wheel plate assembly 13 employed in the embodiment of FIGS. 1–10.

The stanchion 110 is constructed and arranged to be supported on a base 113 which may be the floor of a flat deck railway car and is movable from a collapsed position as shown in FIG. 12 to the erect operative trailer supporting position shown in FIG. 11. Raising of the stanchion 110 is accomplished by the application of a pulling force applied to the vertical strut 111 rather than on the diagonal strut as hereinbefore described in the embodiment of FIGS. 1–10. To this end, the lower ends of the diagonal struts 112 are supported on the base 113 for sliding movement from a position remote from the vertical strut toward a position in closer proximity thereto upon raising of the stanchion 110.

As shown in particular in FIGS. 11, 12, 13, and 16 the vertical strut 111 includes a pair of transversely spaced strut legs 114 across the rear faces of which there is fixed a reinforcing plate 116 spanning the legs 114. The strut legs 114 are each pivotally connected at the lower ends thereof by means of pivot pins 117 mounted in respective pairs of pivot brackets 118—118 fixed to the base 113. The fifth wheel support plate assembly 13 is pivotally supported on the upper ends of the strut legs 114 by means of pivot pins 119 supported by the downwardly depending flanges 21 from the underside of the plate 74.

The diagonal strut 112 includes diagonal strut members 112a which are each of identical structure and include, as shown in particular in FIGS. 11, 12, 13 and 15, a pair of laterally spaced plates 121 connected by way of a transverse extending web 130 welded along its edges to the inner walls of the plates and supporting at the lower ends thereof a slide pin 122. At the upper ends the legs 112a are pivotally fastened to the respective vertical strut legs 114 at a point spaced below the fifth wheel support plate pivot 117 leg by means of a pivot stud 123 and nut 124. The diagonal strut plates 121 are arranged to embrace bosses 126 formed on the respective vertical strut legs 114 about the openings accommodating the pivot studs 123.

The slide pins 122, as shown in particular in FIGS. 17 and 18 are each formed with an intermediate cylindrical section 127 and the ends of the pins 122 projecting outwardly of the outer sides of the legs 121 are formed of a rectangular section 128 and are slidable within guiding grooves 129, 129a formed in the guiding means 131 fixed to the base 113 and associated with each of the diagonal strut members 112a. Fixing the slide pins 122 against turning relative to the diagonal strut legs 121 is a key plate 132 fixed across the inner walls of the leg plates 121 and having an edge portion 133 disposed within a slot 134 formed in the cylindrical section 127. In this manner the studs 122 are prevented from turning relative to the legs 121 so that the rectangular end portions 128 assume the position shown in FIG. 18 when the stanchion 110 is in its erect operative position.

As heretofore mentioned, the lower ends of the diagonal strut members 112a are movable toward the vertical strut 111 upon erection of the stanchion 110 to its operative position. The diagonal strut members 112a are guided by means of the guideway 131 having the guiding grooves 129 and 129a formed therein receiving the rectangular ends 128 of the slide pins 122. As shown in FIGS. 19 and 20 the guiding means 131 may be formed in two sections including a forward section 136a and a rear section 136 of which the latter is in closer proximity to the vertical strut 111. The forward section 136a includes transversely spaced trackways 137 which may be formed of sheet metal as shown in FIG. 20. The trackways 137 each are formed by an outer member 138 having an upstanding vertical web 139 of which the lower end is fixed to the base 113. Projecting inwardly from the upper end is a horizontal flange 141. Fixed against the inner wall of the upstanding web 139 is a similarly bent member 142 including a vertical web 143 of lesser height than the vertical web 139 and having an inwardly projecting horizontal flange 144 which serves as the base of the guiding groove or trackway 129a in which the rectangular ends 128 of the slide pins 122 ride.

The rear sections 136 of the guideways 131 as shown in FIG. 19 are each formed from transversely spaced blocks 146 along the inner walls of which there are formed the guiding grooves 129. The guiding grooves 129 are arranged so that the lower surface 149 thereof is substantially in alignment with the flanges 144 of the trackway 129a formed in the forward section 136a. It is to be noted that the forward end of the upper wall of the guiding grooves 129 slope downwardly from the upper horizontal flange 141 so that the major length of the guiding groove 129 is about the same height as the sides of the rectangular ends 128. In this manner the rectangular ends 128 are snugly guided for sliding movement within the guiding grooves 129. Extending upwardly from each of the guiding grooves 129 and communicating therewith is a locking notch 149 into which the rectangular ends 128 of the slide pins 122 seat when the stanchion 110 is in its erect operative position as shown in particular in FIGS. 11, 17 and 18.

In the collapsed position of the stanchion as shown in FIG. 12, the slide pins 122 lie in the trackways 129a adjacent the outer ends of the forward guideway sections 136a, and the rectangular ends 128 are diagonally disposed. As shown in FIG. 20, the vertical spacing of the upper and lower flanges 141 and 144 of the trackways 129a is such as to accommodate this diagonal length of the rectangular end 128. As the stanchion 110 is raised upwardly, the diagonal strut members 112a slope relative to the base and the slide pins 122 fixed to the lower ends thereof turn so that the rectangular ends 128 gradually assume the position wherein the upper and lower sides thereof are parallel with the upper and lower flanges 141 and 144. Thus, when the rectangular ends 128 of the slide pins 122 enter the narrower guiding grooves 129 in the rear guideway section 136, the ends 128 are readily accommodated therein. When the lower ends of the diagonal strut members 112a are located beneath the locking notches 149, the vertical component of the force lifting the stanchion and which is transmitted through the diagonal strut 112 is effective to pull the lower ends thereof upwardly and seat the slide pin rectangular ends 128 within the notches 149. In this manner further lengthwise movement of the stanchion 110 is prevented and the latter is maintained in its erect operative trailer position for supporting and hitching a trailer on the railroad car.

To prevent the inadvertent collapse of the stanchion there is provided a latching arrangement 151 for retaining the rectangular end section 128 captured within the lock notches 149. As shown in particular in FIGS. 17 and 18 the latching arrangement 151 includes a yoke 152 having arms 153 extending inwardly from a bight portion 154. The arms 153 are slidably disposed in respective ones of the pivot guide grooves 129 of the rear guideway section 136. Biasing the yoke 152 so that the arms 153 normally underlie the locking notches 149 is a biasing spring 155. The biasing spring 155 encircles a hollow circular rod 156 which is fixed at one end to a collar 157. The collar 157 is fixed as by welding to the bight 154 and a block 158 fixed to the underside of the bight 154. At its other end the rod 156 is slidably supported in an opening 159 formed in a laterally extending block 161 fixed along its bottom edges to the base 113 and along its ends to laterally spaced brackets 162 which are fixed to the base 113 and to respective ones of the guide blocks 146.

As shown, the biasing spring 155 is disposed between the collar 157 and the plate 161 so as to normally urge the yoke arms 153 into underlying relationship with the locking notches 149. Limiting inward movement of the yoke is a stop collar 163 fixed to the rod 156 and engageable with the laterally extending block 161.

As above described, the biasing spring 155 normally urges the yoke arms 153 within the guide slots 129 so as to underlie the locking notches 149. During raising of the stanchion 110 the rectangular ends 128 of the slide pins 122 engage the ends of the yoke arms 153 whereby the yoke 152 is moved rearwardly against the force of the biasing spring 155. When the rectangular ends 128 are aligned with the locking notches 149 the upward component of the pulling force applied to raise the stanchion is operative to seat the rectangular ends 128 within the notches 149. Thereupon, the biasing force of the spring 155 is operative to urge the yoke 152 forwardly so that the yoke arms 153 again underlie the locking notches 149 and thereby retain the rectangular ends 128 of the slide pins 122 captured therein. In this manner the diagonal strut 112 is retained fixed against sliding movement and the stanchion 110 is also maintained latched in its erect position.

In accordance with the present embodiment there is provided an arrangement for automatically releasing the latch by co-action with a member carried by the tractor employed to unload the trailer hitched to the stanchion. The diagonal strut releasing arrangement 164 as shown in particular in FIGS. 11, 14, 21 and 22 includes a pusher button 165 extending through an opening 166 formed in the reinforcing plate 116 substantially midway of the strut legs 114 and disposed so as to be engageable with the members fixed to the tractor chassis (not shown). Surrounding the opening 166 on one side of the reinforcing plate 116 is a collar 168, on the other side of which there is fixed a pair of brackets 169 between which there extends the inner end 171 of the pusher button 165. The pusher button 165 is formed at the inner end 171 with flatted sides to which there is fastened by means of a pin 172 a pair of clevis plates 173 fixed to the upper end of a rock lever 174. The rock lever 174 is fulcrumed for rocking movement intermediate its ends on pin 176 carried by a pair of spaced brackets 177 fixed to a channel member 178 which is suitably fastened to the vertical strut reinforcing plate 116. As shown in FIG. 22 the rock lever 174 may have spacer collars 179 fixed on the opposite sides thereof to prevent lateral play. At its lower end, the rock lever 174 is turnably connected by means of a pin 181 to one end of a pair of connecting levers 182 of which the other ends are turnably connected by means of a pin 183 to a lug 184 projecting from and fixed to a vertical leg 186 of an angle piece 187. The horizontal leg 188 of the angle piece 187 is fixed to the underside of a transversely extending horizontal plate 189 substantially midway of the ends thereof. As shown in FIGS. 14, 17, and 18, the ends of the plate 189 extend through slots 191 formed in the projecting ends of the hollow spring guiding rods 156 of each of the latch means 151 and are fixed to the rods 156 as by welding so that the latching members 151 are interconnected for simultaneous actuation.

Normally the automatic latch release arrangement 164 assumes the position shown in FIGS. 21 and 22. However, when the stanchion 110 is being raised to the elevated position and the rectangular ends 128 of the diagonal strut slide pins 122 engage the yoke arms 153, the spring guiding rods 156 fixed thereto are moved rearwardly so that the lateral horizontal arm 189 fixed across the ends of rod 156 is correspondingly displaced. The rearward movement of the lateral horizontal arm 189 causes the rock lever 174 to be rocked counterclockwise via the connection of the connecting rods 183 at the lower ends thereof. After the rectangular ends 128 of the slide pins 122 are seated within the locking notches 149, the yoke 152 is biased forwardly into the locking position. At the same time the automatic latch release mechanism 164 assumes the position shown in FIG. 21.

Unloading of the trailer from the flat car is generally accomplished by backing the tractor until the rear end of the chassis is in close proximity to the vertical strut 111 of the stanchion 110 supporting the forward end of the trailer thereon. Upon further backing of the tractor the member 167 fixed to the chassis abuts against the pusher button 165 connected to the upper end of the rock lever 174 and causes the latter to rock counterclockwise about its pivot 176 such that the connecting rods 182 at the lower end are operative to move the lateral bar 189 rearwardly. Rearward movement of the bar 189 correspondingly moves the spring guide rods 156 fixed thereto so that the force of the biasing spring 155 is overcome and moves the yokes to the release position clear of the locking notches 149. The rectangular ends 128 of the diagonal strut slide pins 122 are thus free to re-enter the guiding groove 129. Hence, upon further backing movement of the tractor the force applied by the latter on the stanchion 110 dislodges the rectangular ends 128 such that the latter are slidable toward the forward end of the guideway section 136a and the stanchion 110 collapses under its own weight.

Referring now in particular to FIGS. 11, 13 and 29–35 there is shown a buffer arrangement 271 for arresting the free falling movement of the stanchion to its collapsed position. The arresting means 271 includes a housing 272 suitably fixed to the base 113 intermediate the diagonal strut guiding means 131. Disposed within the housing 272 is a cushioning or shock absorbing unit 273 comprising an annular forward follower plate 274 which is engageable with a stop plate 276 fixed to the forward end of the housing 272 and an annular rear follower plate 277. Disposed between the forward and rear follower plates 274 and 277 are a plurality of annular resilient cushion means 278 which may be formed of rubber pads or the like. The rubber pads 278 are separated by metallic discs 279.

Extending through the openings 281 and 282 in the rubber pads 278 and discs 279 is a shaft 283 of which the rear end extends through the opening in the rear follower plate and has threaded thereon a nut 284. At its forward end the shaft extends through the opening 286 in the forward follower plate 274 and has threaded thereto a clevis block 287 of substantially rectangular section.

As shown in FIGS. 32–34 the rear end of clevis block 287 in the normally extended position of the cushion unit 273 is loosely accommodated within a rectangular opening 288 in the stop plate 276 so that the rear face 289 abuts the forward follower plate 274.

Pivotally connected between the celvis arms 291 by means of a pivot pin 292 is a projecting ear 293 of a sliding member 294. The sliding member 294 is formed as shown of a body of substantially inverted T-section of which the outwardly projecting horizontal limbs 296 are slidably guided within grooves 297 of a slide block 298 which is fixed to the base. Disposed between and fixed to the adjacent ends of the slide block 298 and the stop plate 276 are transversely spaced plates 300.

The rear end of the sliding member 294 is cut away to provide a stem portion 299 projecting rearwardly so that the rear face 301 is engageable along its lower portion with the stop plate 276 and its upper portion extends above the housing 272 and is engageable with an actuating crosspiece 302 fixed between the inner plates 121 of the diagonal strut members 112a. As shown in FIG. 35 the actuating crosspiece 302 is formed with undercuts at each of its ends to provide a firm attachment limb. Moreover, the lower edge of the crosspiece on either side of the face engageable with the rear face of the slide member stem may be cut away.

As heretofore described, during free falling movement of the stanchion 110 the lower ends of the diagonal strut 112 move lengthwise rearwardly. During the rearward movement and prior to assuming the fully collapsed position, the cross piece 302 engages the rear face 301 on the stem 299 whereupon the slide member 294 is moved forwardly within the guide block 298 until the stanchion 110 is completely collapsed as shown in phantom lines in FIG. 29. At the same time the rod or shaft 283 fastened thereto at the ear 293 is correspondingly moved forwardly so that the rear follower plate 277 compresses the rubber pads 278 against the forward follower plate 274 which abuts the stop plate 276. In this manner the resilient or rubber pads 278 provide a force resisting lengthwise movement of the diagonal struts and retards the free falling stanchion sufficiently to minimize the impact thereof on the base.

The cushion unit 273 remains compressed in the collapsed position of the stanchion so that when a pulling force is applied to raise the latter, the force of the cushion unit 273 is available to assist in initiating the rearwardly lengthwise movement of the diagonal strut legs 112a. When the crosspiece is out of engagement with the stem 299 the components of the arresting unit 271 assume the position shown in FIGS. 29 and 30.

Turning now in particular to FIGS. 23 to 28 there is shown in greater detail the structure of the fifth wheel plate assembly 13 which may be utilized with the stanchions 10 and 110 illustrated in FIGS. 1–10 and FIGS. 11–22, respectively. The fifth wheel support plate assembly 13 includes the plate 74 from the underside of which there depends the flanges 21—21 between which the upper ends of the vertical strut legs 16 or 114 are pivotally secured. The plate 74 is formed with a substantially centrally located circular opening 76 which communicates with a kingpin entry slot 77 extending inwardly from the leading edge 196.

As shown, the center line of the kingpin entry slot 77 is displaced to one side of the center line of the circular opening 76 and is defined by inwardly converging sides 197 and 198 and a tangential side arranged substantially normal to the leading edge 196.

Fixed to the underside of the plate 74 and disposed coaxial with the opennig 76 is a coupler jaw housing 201. Fastened within the housing 201 is a coupler jaw support assembly 202 including a support plate 203 upon which the coupler jaw 78 is supported for turning movement. The portion of the coupler housing 201 and support jaw support assembly 202 underlying the entry slot 194 are formed with openings 206 and 207 to accommodate the length of the kingpin K so that it may be received within the opening 76 as more fully to be explained hereinafter.

The coupler jaw 78 is turnably mounted on the support plate 203 and includes a U-shaped jaw opening 208 including a rim 209 adapted to seat within the groove G of the kingpin K. Formed on the periphery of the locking jaw 78 is a camming surface 211 (FIGS. 23 and 24) having a stop lip 212 disposed at one end thereof and a locking notch 213 at the other end. The stop lip 212 and locking notch 213 co-act with a resiliently biased locking plunger 219 of the coupler jaw locking assembly 79 disposed in a guideway 216 formed by transversely spaced blocks 217—217 fastened to the underside of the support plate 74 and suitably supported by cross braces 218 fixed between the inner ones of the pivot pin support flange 21.

The coupler jaw locking plunger assembly 79 includes the plunger 219 of which the inner end is slidably supported in an opening 221 formed in the coupler jaw housing 201 and the outer reduced end 215 in an opening 220 formed in a flange 224. The inner end of the locking plunger 219 is urged into engagement with the camming surface 211 on coupler jaw 78 by means of a biasing spring 223 disposed about the reduced end 215 of the opening 220 engaging at one end a shoulder 225 on the plunger 219 and at its other end the flange 224.

In the unlocked position shown in FIG. 23 the inner end of the locking plunger 219 engages the stop lip 212 so as to limit the counterclockwise movement of the coupler jaw 78 and retain it in the kingpin receiving position shown. As the kingpin K passes through the entry slot and engages the coupler jaw 78, the latter is turned clockwise whereupon the raised camming surface 211 is operative to retract the locking plunger 219 against the force of the biasing spring 223 until the locking notch 213 is aligned with the plunger 219. Thereafter, the plunger 219 seats within the locking notch 213 and prevents further turning of the coupler jaw 78 and retains the latter locked within the kingpin opening and fastened to the support plate 74 as shown in FIGS. 24 and 28.

In connection with the engagement of the kingpin K with the coupler jaw 78, it should be noted as shown in FIGS. 23, 24, and 28 that the coupler jaw support plate is arranged to provide a guiding edge 226 which extends from the end corner 227 of the entry slot guiding edge 197 in substantially parallelism to the tangential side 199. The guiding edge 226 of the plate 203 is transversely spaced from the tangential side 199 as shown in FIG. 28 so that the upper diameter U of the kingpin K contacts the guiding edge 199 and the lower diameter L of the kingpin K below the latching groove G slidably contacts the plate edge 226. In this manner the support plate guiding edge 226 serves to insure that the kingpin engages the coupler jaw opening in a manner which permits only clockwise turning thereof upon further movement into the circuit opening 76. As the kingpin enters the opening 76 the coupler jaw continues its clockwise movement until the notch 213 aligns with the plunger 219 and is locked as shown in FIG. 24.

It is to be observed that the locking jaw 78 is supported on the support plate 74 so that a length of the upper diameter thereof, above the peripheral rim 209, lies within the confines of the circular opening 76. Moreover, the top surface of the coupler jaw 78 lies substantially coplanar with the upper surface of the support plate 74. This arrangement of the coupler jaw 78 disposed within the confines of the opening 76 so as to be turnable therein is made possible by way of the guiding edge arrangement 226 above described which introduces the kingpin into engagement with the coupler jaw such that the latter is movable clockwise only as viewed in FIGS. 23 and 24.

Heretofore, in the absence of the kingpin guiding arrangement of the present invention it was possible for the kingpin to engage the coupler jaw in a manner which tended to bind the coupler jaw within its support housing and thereby prevented free turning thereof to the locked position. Because of this difficulty the upper surface of the coupler jaw was disposed below the bottom surface of the support plate. With the prior structure, it should be readily apparent that the length of the upper end of the kingpin fixed to the trailer was substantially unsupported. Under these conditions, the kingpin was subject to severe bending moments caused by the forces normally present during transit of the trailer on the railway car.

However, with the structure of the present invention substantially the entire length of the kingpin K is supported by the confinement within the coupler jaw 78 as illustrated in FIG. 28 such that failure of the kingpin in bending is prevented.

In accordance with the present invention there is provided a means for automatically releasing the coupler jaw 78 so that the trailer may be detached therefrom when the tractor is positioned to remove the trailer. As shown in FIGS. 25 and 26 the coupler jaw releasing means 228 includes a push button 229 threadably connected to one end of an actuating rod 231 to the other end of which there is fastened a camming block 232. The button 229 fixed to the actuator rod 231 is slidably supported in an opening 233 formed in a vertical plate 234 extending across the lower ends of the entry slot sides 197 and 198. For providing further support for the vertical plate 234 is a horizontal plate 236 suitably supported by a gusset 237 as shown in FIG. 25.

The camming block 232 is preferably formed of substantially rectangular section having an inclined camming surface 238 formed on its leading end. At its other end the camming block 232 is suitably fixed as by a force fit to the other end of the actuator rod 231. The camming block 232 is slidably supported in a housing 239 including a top plate 241 which is bolted to the underside of the coupler jaw housing 201, sides 242, and a bottom wall 243. At the inner end, there is fixed an end wall 244 having an opening 246 accommodating the actuating rod 231. Disposed between the housing end wall 244 and the shoulder 247 defined by the end of the button 229 fixed to the other end of the actuator rod 231 is a biasing spring 248 which serves to normally urge the camming block 232 into engagement with the end wall 244. In this position, the camming block 232 is retained within the housing 239 and a portion of the inclined camming surface projects from the open end thereof.

Contacting the inclined camming surface 238 is a follower roller 249 of a follower assembly 251. The follower assembly 251 includes a pair of laterally spaced support plates 252 of substantially triangular contour. Fixed across the upper edges and the rear edges of the support plate 252 is tie plate 253. The follower roller 249 is turnably mounted on a shaft 254 supported by the plates 252 at the lower corners thereof. At the other lower corner, there is turnably mounted a shaft 256 carried by a pair of laterally spaced downwardly depending flanges 257 which are fixed at the upper ends thereof to the underside of the fifth wheel support plate 74 to the plunger guide blocks 217. In this manner the follower assembly 251 is mounted for rocking movement relative to the top plate 74.

At the upper corners of the plates 252 there is supported a shaft 258 which turnably supports a pivot block 259 having a threaded end 261 which is extended through an elongated opening 262 provided in the locking plunger support plate 263 and is threaded into the plunger 219 substantially intermediate the ends thereof.

Assuming that the tractor is being backed into its position for removing the trailer from the stanchion 110 or the stanchion 10, as the trailer is backed the member 264 fixed to the tractor chassis abuts against the button end 229 of the actuator rod 231. Upon further backing, the actuator rod 231 is moved inwardly with respect to the leading edge of the support plate 74 whereupon the camming block 232 at the other end of the actuating rod 231 is displaced outwardly of the housing 239. During this movement of the camming block 232, the follower roller 245 engaging the inclined camming surface 238 causes the following assembly 251 to be rocked counterclockwise about the pivot shaft 256. As the rocker assembly 251 is rocked about the pivot 256, the pivot block 259 threaded into the locking plunger 219 is operative to retract the locking plunger 219 from the locking notch 213 so that the coupler jaw 204 is free to turn counterclockwise to its release position as the kingpin K is moved outwardly toward the entry slot 77. It is to be observed the inclined camming surface is of a length such that the locking plunger 219 is fully retracted when the cam roller 249 engages the upper ends thereof. Thereafter, during further movement of the camming block 232 outwardly of the housing 239, the camming roller 249 rides on the upper horizontal face 266 which forms in the nature of an idler surface such that the camming assembly 251 is no longer rocked counterclockwise about the pivot 256. In this manner, the plunger 219 is not retracted beyond the phantom line position shown in FIG. 25. The formation of an idler surface 266 on the upper face of the camming block 232 is advantageous in permitting simultaneous actuation of the diagonal strut release 164 and coupler jaw release 228.

As shown in FIG. 11, the members 167 and 264 fixed to the tractor chassis for actuating the diagonal strut releasing arrangement 164 and the coupler jaw release 228, respectively, are arranged to abut the respective buttons 165 and 229 at substantially the same time. Under some circumstances the conditions may be such that the member 264 engages the button 229 before the member 167 engages the button 165. Under these conditions the coupler jaw is released when the follower cam 249 engages the top end of the inclined cam surface 238. Thus, upon further backing movement of the tractor the follower roller 249 may be riding on the idler surface 266 of the camming block 232 before the diagonal strut release button 165 is sufficiently depressed to displace the yoke 152 to the release position of the cam roller 232 on the idler surface 266 and no further withdrawal of the locking plunger 219 occurs. When the diagonal struts are released, the force of the tractor backing against the trailer is operative to provide the force necessary to dislodge the diagonal strut pivot studs 122 from locking notches so that the stanchion is rendered free falling to its collapsed position.

What is claimed is:

1. A stanchion for supporting and hitching a trailer on a railway car, said stanchion comprising an upright strut pivotally connected at one end to a base, a fifth wheel plate pivotally connected to the other end of said upright strut, a diagonal strut pivotally connected at one end relative to said upright strut, means guiding the other end of said diagonal strut for sliding movement lengthwise of said base when said stanchion is moved between a collapsed position and an erect trailer supporting position, said guiding means including notch means disposed to preclude lengthwise movement of said sliding other end when said stanchion is in said erect position, latch means located in the path of movement of said slidable other end, said latch means being displaceable from said path of movement upon engagement of said slidable other end of said diagonal strut until said slidable other end is disposed within said notch, and means urging said latch means to a position into said path of movement to retain said slidable other end captured within said notch.

2. The invention as defined in claim 1 wherein there is provided a latch releasing means for displacing said latch means out of the path of movement of said slidable other end so that the latter is free to slide and thereby to permit said stanchion to assume said collapsed position, said latch releasing means including actuating means mounted on said upright strut and adapted to be engaged by means on the tractor employed to remove the trailer hitched on said stanchion.

3. The invention as defined in claim 2 wherein said fifth wheel plate includes a locking jaw mounted for movement between a released position and locked position, a locking jaw latch for retaining said locking jaw in said locked position, and means on said latch releasing means operative to release both said locking jaw latch and said latch means retaining said slidable other end captured within said notch.

4. The invention as defined in claim 1, wherein said movable latch means is disposed for lengthwise movement within said guiding means and lies in the path of movement of said other end of said diagonal strut, and wherein means urges said latch means to a normal position overlying said notch means, said latch means being displaceable against the force of said urging means from said overlying position upon engagement of said slidable other end of said stanchion during raising thereof until said slidable other end is seatably received within said notch means whereby said urging means urges said latch means in said overlying position, and latch releasing means for displacing said latch means to permit said slidable means on said other end of said stanchion to re-enter said guiding means whereby said other end is free to slide and thereby collapse said stanchion.

5. The invention as defined in claim 4 wherein said latch releasing means includes actuating means mounted on said upright strut and adapted to be engaged by means on the tractor employed to remove the trailer hitched on said stanchion.

6. The invention as defined in claim 4 wherein said latch releasing comprises means located remote from said diagonal strut, said remote latch releasing means including lever means freely rockable upon displacement of said latch means by said slidable other end and being rockable to overcome the force of said resilient means to move said latch means from said overlying position.

7. A stanchion for supporting and hitching a trailer on a railway car, said stanchion comprising an upright strut pivotally connected at one end to a base, a fifth wheel plate pivotally connected to the other end of said strut, a diagonal strut pivotally connected at one end relative to said upright strut, means guiding the other end of said diagonal strut for sliding movement lengthwise of said base when said stanchion is moved between a collapsed position and an erect trailer supporting position, said guiding means including notch means disposed to preclude lengthwise movement of said sliding other end when said stanchion is in said erect position, and resiliently biased latch means normally overlying said notch means and located in the path of movement of said slidable other end, said latch means being lengthwise displaceable from said overlying position upon engagement of said slidable other end of said diagonal strut until said slidable other end is disposed within said notch whereby said latch means resumes said overlying position to retain said slidable other end captured within said notch.

8. The invention as defined in claim 7 wherein said latch means comprises a member slidable within said groove means, a rod means fixed to said means and resilient means biasing said member to a position overlying said notches.

9. The invention as defined in claim 8 wherein said rod means includes an elongated slot formed therein, a lever extending through said slot, and means on said base contacting said lever to provide a fulcrum about which said lever is rockable to retract said latch means from said notch overlying position.

10. The invention as defined in claim 8 including means for releasing said latch from said notch overlying position comprising a lever, means mounting said lever on said vertical strut for movement toward and away from said rod means, means connecting one end of said lever to said rod means, and means fixed to the other end of said lever and engageable with a member on the tractor employed to remove a trailer supported on said stanchion, said lever upon engagement of the tractor supported member with said means on said other end of said lever causing said lever to be rocked so that said latch means is retracted from said notch overlying position.

11. A stanchion for supporting and hitching a trailer on a railway car, said stanchion comprising an upright strut pivotally connected at one end to a base, a fifth wheel plate pivotally connected to the other end of said upright strut, a diagonal strut pivotally connected at one end to said upright strut, means guiding the other end of said diagonal strut for free sliding movement lengthwise of said base when said stanchion is moved between a collapsed position and an erect trailer supporting position, said stanchion being rendered free falling when moving from said erect position to said collapsed position, and buffer means including a housing fixed to said base, said housing having an open end facing the path of movement of said other end of said diagonal strut, and resilient cushion means projecting from said open end of said housing so as to be compressed by said other end of said diagonal strut when said other end of said diagonal strut engages therewith thereby to provide a force which arrests free falling movement of said stanchion.

12. A stanchion for supporting and hitching a trailer on a railway car, said stanchion comprising an upright strut pivotally connected at one end to a base, a fifth wheel plate pivotally connected to the other end of said upright strut, a diagonal strut pivotally connected at one end to said upright strut, means guiding the other end of said diagonal strut for free sliding movement lengthwise of said base when said stanchion is moved between a collapsed position and an erect trailer supporting position, said stanchion being rendered free falling when moving from said erect position to said collapsed position, and buffer means including means slidably mounted on said base and disposed in the path of movement of said other end of said diagonal strut, said slidably mounted means being engageable with said other end of said strut and lengthwise movable therewith during free falling movement of said stanchion, and cushion means connected to said slidably mounted means resisting the movement of said slide means with said other end of said diagonal strut so as to arrest the free falling movement of said stanchion.

13. The invention as defined in claim 12 wherein said cushion means comprises a housing fixed to said base, a resilient cushion means disposed in said housing, and means connecting said resilient cushion means to said slidably mounted means so that said resilient cushion means are compressed within said housing upon sliding movement of said slidably mounted means.

References Cited by the Examiner

UNITED STATES PATENTS

| | | | |
|---|---|---|---|
| 2,880,681 | 4/59 | Markenstein et al. | 105—368 |
| 3,035,801 | 5/62 | Mangels | 248—119 |
| 3,041,028 | 6/62 | McDowell | 248—119 |
| 3,081,115 | 3/63 | Dickey et al. | 287—20 |
| 3,087,748 | 4/63 | Livelsberger et al. | 287—20 |

CLAUDE A. LE ROY, *Primary Examiner.*

FRANK L. ABBOTT, *Examiner.*